United States Patent
Golubovic et al.

(10) Patent No.: US 10,186,356 B2
(45) Date of Patent: Jan. 22, 2019

(54) FLEXIBLE POSITIVE TEMPERATURE COEFFICIENT SHEET AND METHOD FOR MAKING THE SAME

(71) Applicant: Littelfuse, Inc., Chicago, IL (US)

(72) Inventors: Boris Golubovic, San Francisco, CA (US); Weiqing Guo, Palo Alto, CA (US); Jianhua Chen, Sunnyvale, CA (US)

(73) Assignee: Littelfuse, Inc., Chicago, IL (US)

( * ) Notice: Subject to any disclaimer, the term of this patent is extended or adjusted under 35 U.S.C. 154(b) by 11 days.

(21) Appl. No.: 15/643,126

(22) Filed: Jul. 6, 2017

(65) Prior Publication Data

US 2018/0012686 A1    Jan. 11, 2018

Related U.S. Application Data

(60) Provisional application No. 62/358,952, filed on Jul. 6, 2016.

(51) Int. Cl.
| | |
|---|---|
| *H01C 7/02* | (2006.01) |
| *H01M 2/34* | (2006.01) |
| *C08J 5/18* | (2006.01) |
| *C08K 3/08* | (2006.01) |
| *C08K 3/14* | (2006.01) |
| *C09D 11/52* | (2014.01) |

(52) U.S. Cl.
CPC ............... *H01C 7/028* (2013.01); *C08J 5/18* (2013.01); *C08K 3/08* (2013.01); *C08K 3/14* (2013.01); *C09D 11/52* (2013.01); *H01M 2/348* (2013.01); *C08K 2003/0862* (2013.01); *H01M 2200/106* (2013.01); *H01M 2220/30* (2013.01)

(58) Field of Classification Search
CPC ..................................................... H01C 7/028
USPC ........................................................ 338/22 R
See application file for complete search history.

(56) References Cited

U.S. PATENT DOCUMENTS

| | | | |
|---|---|---|---|
| 5,542,163 A | 8/1996 | Chang | |
| 6,362,721 B1 * | 3/2002 | Chen ...................... | H01C 7/027 252/511 |
| 6,495,069 B1 * | 12/2002 | Lussey ................... | H01C 7/027 252/512 |
| 6,713,210 B1 * | 3/2004 | Sato ...................... | H01C 1/1406 429/61 |
| 7,059,769 B1 * | 6/2006 | Potega ................. | B60L 11/1861 338/22 R |
| 2006/0138123 A1 | 6/2006 | Ishii et al. | |
| 2007/0103269 A1 | 5/2007 | Han et al. | |

(Continued)

OTHER PUBLICATIONS

International Search Report and Written Opinion dated Nov. 2, 2017 in corresponding PCT/US2011/040943.

Primary Examiner — Kyung S Lee

(57) ABSTRACT

A flexible sheet of positive temperature coefficient (PTC) material formed of a polymer resin and a conductive filler, the sheet of PTC material having a thickness in a range of 10 μm to 100 μm. A method for forming the flexible sheet of positive temperature coefficient material may include preparing a PTC ink from a polymer resin, a conductive filler, and a solvent, applying the PTC ink to a substrate, pulling a blade over the PTC ink to create a uniformly thick layer of the PTC ink on the substrate, and allowing the PTC ink to dry so that the solvent evaporates and leaves a solid layer of PTC material on the substrate.

17 Claims, 3 Drawing Sheets

(56) References Cited

U.S. PATENT DOCUMENTS

| | | |
|---|---|---|
| 2008/0142494 A1 | 6/2008 | Blake et al. |
| 2011/0111296 A1 | 5/2011 | Berdichevsky et al. |
| 2012/0175362 A1 | 7/2012 | Mikkelsen et al. |
| 2013/0202917 A1* | 8/2013 | Tanaka ............... H01C 7/021 429/7 |
| 2014/0146432 A1* | 5/2014 | Wang ................ H01C 7/021 361/93.7 |
| 2016/0093414 A1 | 3/2016 | Ho et al. |

* cited by examiner

FLEXIBLE POSITIVE TEMPERATURE COEFFICIENT SHEET AND METHOD FOR MAKING THE SAME

CROSS-REFERENCES TO RELATED APPLICATIONS

This application claims the benefit of U.S. Provisional Patent Application No. 62/358,952, filed Jul. 6, 2016, which is incorporated by reference herein in its entirety.

BACKGROUND

Field

The present invention relates generally to positive temperature coefficient (PTC) materials. More specifically, the present invention relates to an ultrathin, flexible sheet formed PTC material.

Description of Related Art

PTC devices are typically used in electronic devices to provide protection against overcurrent and/or overtemperature conditions. PTC material in such devices is selected to have a relatively low resistance within a normal operating temperature range of the electronic, and a high resistance above the normal operating temperature of the electronic device. For example, a PTC device may be connected in electrical series between a battery and a load so that current flowing from the battery to the load flows through the PTC device. The temperature of the PTC device gradually increases as current flowing through the PTC device increases. When the temperature of the PTC device reaches an "activation temperature," the resistance of the PTC device increases sharply. This in-turn sharply reduces the current flowing through the PTC device, thereby protecting the battery and the load from an overcurrent or overtemperature condition.

Existing PTC devices normally include a core material having PTC characteristics surrounded by a package. Conductive pads or conductive leads may be provided on the outside of the package and may be electrically coupled to opposite surfaces of the core material so that current flows through a cross-section of the core material.

Existing PTC materials and devices typically have a thickness of about 200 μm or more which is constrained by conventional manufacturing methods. At such thicknesses, typical PTC materials and devices are too rigid for use in conjunction with applications that may benefit from a PTC material or device having flexible and malleable properties. Such applications include overcurrent and overtemperature protection for batteries in cellular telephones and wearable electronic devices, for example.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a flexible sheet of positive temperature coefficient material (PTC) in accordance with the present disclosure may include a layer of PTC material formed of a polymer resin and a conductive filler, the layer of PTC material having a thickness in a range of 10 μm to 100 μm.

An exemplary embodiment of a method for forming a flexible sheet of PTC material in accordance with the present disclosure may include preparing a PTC ink from a polymer resin, a conductive filler, and a solvent, applying the PTC ink to a substrate, and allowing the PTC ink to dry so that the solvent evaporates and leaves a solid layer of PTC material on the substrate.

An exemplary embodiment of an electronic device in accordance with the present disclosure may include a protected component and a flexible positive temperature coefficient (PTC) device including a flexible sheet of PTC material coupled to an exterior surface of the protected component, the flexible PTC device electrically connected to the protected component and adapted to arrest or mitigate electrical current flowing through the protected component.

DETAILED DESCRIPTION

Exemplary embodiments of a flexible sheet of positive temperature coefficient (PTC) material, a device incorporating the flexible sheet, and methods for making the flexible sheet in accordance with the present disclosure will now be described more fully hereinafter with reference to the accompanying drawings. The flexible sheet, device, and methods may, however, be embodied in many different forms and should not be construed as being limited to the embodiments set forth herein. Rather, these embodiments are provided so that this disclosure will convey certain exemplary aspects of the flexible sheet, device, and methods to those skilled in the art.

Figure 1A:
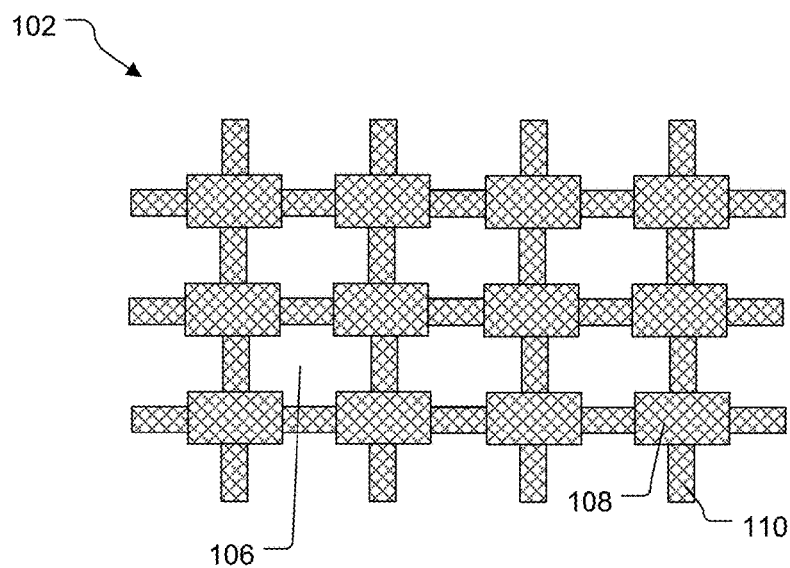
FIG. 1A is a top view illustrating an exemplary embodiment of a flexible sheet of positive temperature coefficient (PTC) material in accordance with the present disclosure.

Referring to FIG. 1a, a top view illustrating a flexible sheet 102 formed of a layer of PTC material in accordance with an exemplary embodiment of the present disclosure is shown. The flexible sheet 102 may have a thickness that is significantly less than that of conventional sheets of PTC material, thus providing the flexible sheet 102 with a flexibility and a malleability that allow the flexible sheet 102 to be wrapped about, and to conform to, the surfaces of other structures and devices (e.g. batteries) while preserving the PTC characteristics of the flexible sheet 102. In a non-limiting example, the flexible sheet 102 may have a thickness in a range of approximately 10 μm to approximately 100 μm. In another non-limiting example, the flexible sheet 102 may have a thickness in a range of approximately 10 μm to approximately 50 μm. In a specific example, the flexible sheet 102 may have a thickness of 25 µm. In another specific example, the flexible sheet 102 may have a thickness of 15 µm.

The flexible sheet 102 may be a perforated, net-like structure formed of a plurality of nodes 108 that are interconnected by a plurality of threads 110 to define a plurality of openings 106. The openings 106, which may improve the flexibility of the flexible sheet 102 relative to a solid, non-perforated sheet, may be formed in the flexible sheet 102 after the flexible sheet 102 is manufactured in the manner described below, such as by punching, cutting, drilling, etching, etc. the flexible sheet 102. The nodes 108 and threads 110 are depicted as being rectangular and linear, respectively, but this is not critical. In various alternative embodiments, the nodes 108 may be circular, triangular, tetrahedral, irregular, etc., and the threads may be curved, zig-zag shaped, etc. without departing from the present disclosure. In some embodiments, greater than 25% of the flexible sheet 102 may be open space defined by the openings 106. In other embodiments, greater than 50% of the flexible sheet 102 may be open space defined by the openings 106. In other embodiments, greater than 75% of the flexible sheet 102 may be open space defined by the openings 106.

Figure 1B:
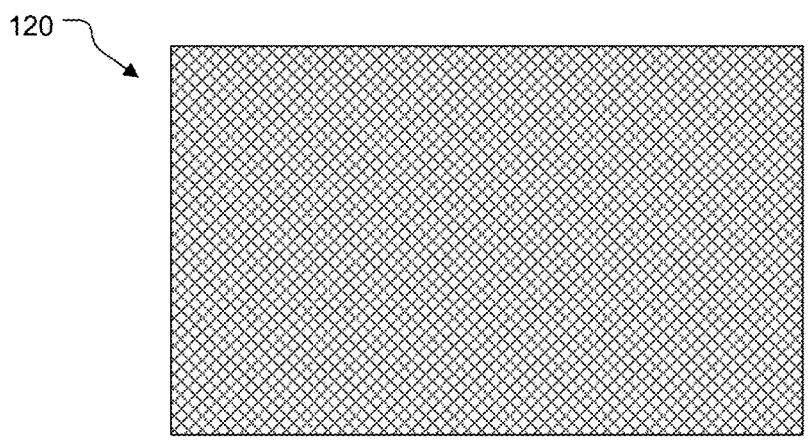
FIG. 1B is a top view illustrating another exemplary embodiment of a flexible sheet of PTC material in accordance with the present disclosure.

Referring to FIG. 1b, a top view illustrating a flexible sheet 120 formed of a layer of PTC material in accordance with an exemplary embodiment of the present disclosure is shown. The flexible sheet 120 may be substantially similar to the flexible sheet 102 described above, but may be formed as a solid layer of PTC material having no perforations or openings formed therein. Like the flexible sheet 102, the flexible sheet 120 may have a thickness that is significantly less than that of conventional sheets of PTC material, thus providing the flexible sheet 120 with a flexibility and a malleability that allow the flexible sheet 120 to be wrapped about, and to conform to, the surfaces of other structures and devices (e.g. batteries) while preserving the PTC characteristics of the flexible sheet 120. In a non-limiting example, the flexible sheet 120 may have a thickness in a range of approximately 10 µm to approximately 100 µm. In another non-limiting example, the flexible sheet 120 may have a thickness in a range of approximately 10 µm to approximately 50 µm. In a specific example, the flexible sheet 120 may have a thickness of 25 µm. In another specific example, the flexible sheet 120 may have a thickness of 15 µm.

Figure 2:
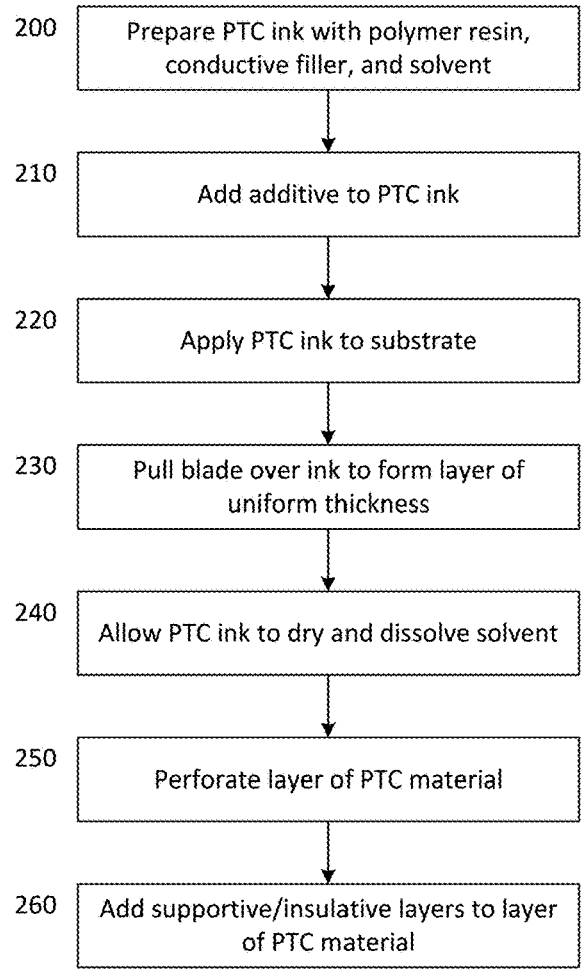
FIG. 2 is a flow diagram illustrating an exemplary method for forming a flexible sheet of PTC material in accordance with the present disclosure.

Referring to FIG. 2, a flow diagram illustrating an exemplary method for forming the above-described flexible sheets 102, 120 of PTC material is depicted. The method described below facilitates the ultra-thin form factor of the flexible sheets 102, 120, which in-turn provides the flexible sheets 102, 120 with flexibility and malleability not found in conventional PTC materials and devices.

In step 200 of the exemplary method shown in FIG. 2, a polymer resin and a conductive filler may be dissolved in a solvent to produce a fluidic, "PTC ink." The polymer resin, which may be provided in pelletized or powdered form, may include particles of semi-crystalline polymer. Examples of semi-crystalline polymers that may be used include, but are not limited to, polyvinylidene difluoride, polyethylene, ethylene tetrafluoroethylene, ethylene-vinyl acetate, ethylene butyl acrylate, and other materials having similar characteristics. The conductive filler may include conductive particles of metal, metal ceramic, carbon, or various other materials selected for specific conductive properties. Specific examples of conductive fillers include, but are not limited to, tungsten carbide, nickel, and titanium carbide. The solvent may be or may include dimethylformamide, N-Methyl-2-pyrrolidone, tetrahydrofuran, tricholorobenzene, dichlorobenzene, dimethylacetamide, dimethyl sulfoxide, cyclohexane, toluene, or a different solvent capable of dissolving or suspending the polymer resin and conductive filler.

In optional step 210 of the exemplary method, an additive, such as an antioxidant, an adhesion promoter, an anti-arcing material, or a different additive, may be added to the PTC ink to improve various characteristics of a flexible sheet (e.g., 102, 120 described above) that will be formed from the PTC ink. Such characteristics may include, but are not limited to, polymer stability, voltage capability, or film adhesion.

In step 220 of the exemplary method, the PTC ink may be applied to a substantially flat surface or substrate. For example, the PTC ink may be poured or sprayed onto a substantially flat surface. In step 230 of the method, a blade may be pulled over the PTC ink, with an edge of the blade disposed parallel to, and spaced a short distance (e.g., 15 µm) above, the surface to produce a uniform layer of PTC ink having a desired thickness. The thickness of the uniform layer of PTC ink may be in a range of approximately 10 µm to approximately 100 µm, for example.

In step 240 of the exemplary method, the PTC ink may be allowed to dry, whereby the solvent may evaporate out of the ink, leaving an ultrathin, solid layer of PTC material similar to the flexible sheet 120 described above. In an optional step 250 of the method, the layer of PTC material may be punched, etched, cut, drilled, etc. to form an ultrathin, perforated sheet of PTC material similar to the flexible sheet 102 described above. In optional step 260 of the method, one or more additional layers of material, including, but not limited to, a flexible supporting film and/or a flexible insulating substrate, may be applied to the layer of PTC material as may be appropriate for a particular application.

Figure 3:
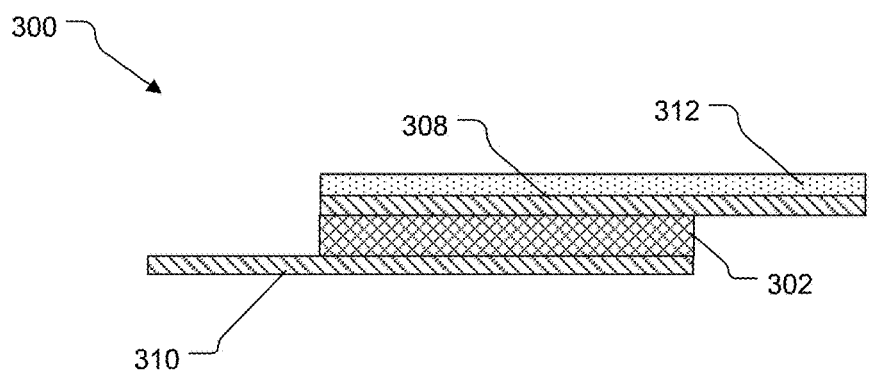
FIG. 3 is a cross sectional view illustrating an exemplary embodiment of a PTC device in accordance with the present disclosure.

Referring to FIG. 3, a cross sectional view of an exemplary PTC device 300 that includes an ultrathin, flexible sheet 302 of PTC material in accordance with the present disclosure is shown. The flexible sheet 302 may be substantially identical to either of the perforated or solid flexible sheets 102, 120 described above. Particularly, the flexible sheet 302 may be flexible and malleable and may have a thickness in a range of approximately 10 µm to approximately 100 µm. In a specific example, the flexible sheet 302 may have a thickness of 25 µm. In another specific example, the flexible sheet 302 may have a thickness of 15 µm.

The PTC device 300 may further include first and second layers of flexible, conductive foil or metallized polyamide material 308, 310 (hereinafter "the first conductive foil 308" and "the second conductive foil 310," respectively) that may be coupled to opposing planar surfaces of the flexible sheet 302. The first and second conductive foils 308, 310 may be formed of copper, nickel, or the like, for example. The conductive foils 308, 310 may act as thermal contact layers that provide the PTC device 300 with enhanced thermal conductivity. The conductive foils 308, 310 may also extend from the flexible sheet 302 and may serve as electrical leads for facilitating electrical connection of the PTC device 300 between an source of electrical energy and a load as further described below. In various embodiments, one or both of the conductive foils 308, 310 may be provided with an electrically insulating substrate or covering 312 coupled thereto for preventing inadvertent electrical contact with surrounding devices or structures.

Figure 4:
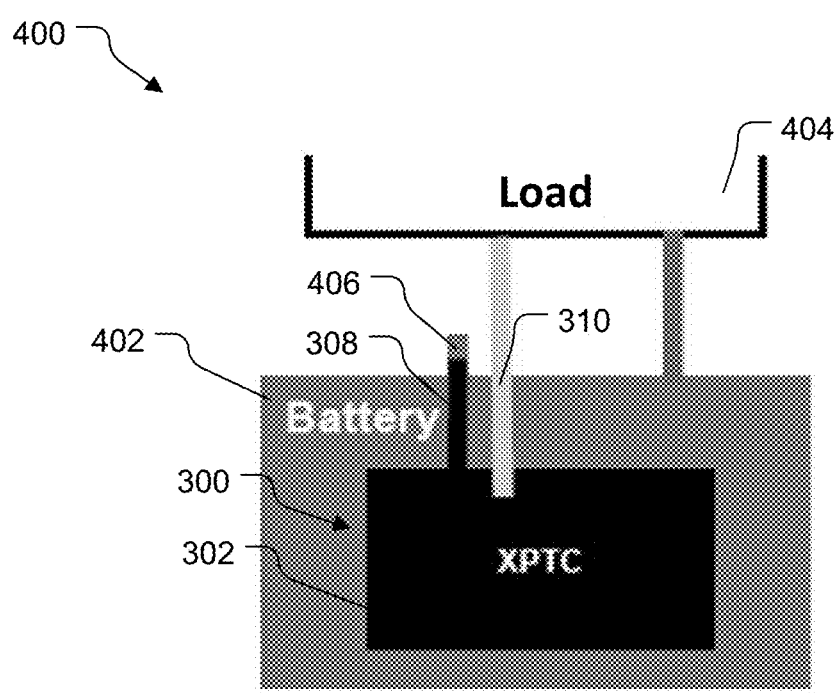
FIG. 4 is a schematic view illustrating an exemplary embodiment of an electronic device in accordance with the present disclosure.

Referring to FIG. 4, a schematic illustration of an exemplary electronic device 400 implementing the above-described PTC device 300 is shown. The electronic device 400 may include one or more components (hereinafter "the protected component") that may be protected by the PTC device 300. In the exemplary embodiment shown in FIG. 4, the protected component is a battery or pack of batteries 402 (hereinafter collectively referred to as "the battery 402"). The present disclosure is not limited in the regard, and it is contemplated that the protected component may alternatively be, or may alternatively include, any of a variety of electrical power sources and/or electrical devices that may benefit from overcurrent or overtemperature protection.

In various examples, the battery 402 may be a Li-ion battery, a Li-Polymer battery, a Ni-MH rechargeable battery, or the like. While the battery 402 is shown as being generally rectangular, that battery may, in various embodiments, have a variety of other shapes (e.g., cylindrical, irregular) as may be suitable for a particular application. Additionally, the battery 402 may, in various embodiments, be flexible, such as may be suitable for use in flexible, wearable electronic devices.

The PTC device 300 may be coupled to the battery in a conforming relationship with an exterior surface thereof. The flexible sheet 302 is schematically shown as covering a portion of a front surface of the battery 402, but in various alternative embodiments that flexible sheet may cover a majority of, or an entirety of, an exterior surface of the battery 402. In some examples, the flexible sheet 302 may cover less than 25% of an exterior surface of the battery 402. In other examples, the flexible sheet 302 may cover greater than 25% of an exterior surface of the battery 402. In other examples, the flexible sheet 302 may cover greater than 50% of the exterior surface of the battery 402. In further examples, the flexible sheet 302 may cover greater than 75% of the exterior surface of the battery 402. In some examples, the flexible sheet 302 may be wrapped, bent, or shaped around edges, corners, contours, and other surface features of the battery 402 in a conforming or substantially conforming relationship therewith (e.g., in flat or continuous contact therewith). In various examples, the PTC device may be coupled to the battery 402 using ultrasonic welding, laser or plasma cleaning and clamping, conductive epoxy, various other conductive or non-conductive adhesives, etc. The present disclosure is not limited in this regard.

The PTC device 300 may be configured to sense an overcurrent or overtemperature condition in the battery 402 and to arrest or mitigate current flowing to or from the battery upon the occurrence of such a condition. For example, the PTC device 300 may be connected in electrical series between the battery 402 and an electrical load 404 (e.g., an electrical circuit in a wearable electronic device, a cellular telephone, etc.) that is powered by the battery 402. For example, the first conductive foil 308 of the PTC device 300 may be connected to a positive or negative terminal 406 of the battery 402, and the second conductive foil 310 of the PTC device 300 may be connected to the electrical load 404. Thus, the PTC device 300 may operate to prevent or mitigate damage to the load 404 and/or the battery 402 that might otherwise result from an overcurrent or overtemperature condition in the electronic device 400. For example, upon the occurrence of an overcurrent or overtemperature condition in the electronic device 400, the temperature of the battery 402 (or a portion of the battery 402) may increase, causing the temperature of the adjacent flexible sheet 302 to increase. When the temperature of the flexible sheet 302 reaches an "activation temperature," the resistance of the PTC material which from which the flexible sheet 302 is formed may increase sharply. This in-turn arrests or mitigates the current flowing through the flexible sheet 302 and between the battery 402 and the load 404, thereby protecting the battery 402 and the load 404 from the overcurrent condition. When overcurrent condition subsides, the temperatures of the battery 402 and the flexible sheet 302 may decrease below the activation temperature, and current may again be allowed to flow between the battery 402 and the load 404 as during normal operation.

Those of ordinary skill in the art will appreciate numerous advantages provided by the above-described ultrathin, flexible sheets 102, 120, and 302 as implemented in a PTC device (e.g., the above-described PTC device 300). For example, since the flexible sheets 102, 120, and 302 are flexible and malleable, the flexible sheets 102, 120, and 302 may flex, bend, expand, and contract to accommodate flexing, bending, thermal expansion, and thermal contraction of an underlying battery. Furthermore, since the flexible sheets 102, 120, and 302 can be wrapped about, or otherwise disposed on, an entire exterior surface (or a majority of an exterior surface) of a battery, the flexible sheets 102, 120, and 302 may be effective for sensing temperature increases over a much greater surface area of a battery relative to point sensors that are used in conventional overcurrent/overtemperature protection devices and that only sense temperatures on small, discrete points or portions on an exterior of a battery. Still further, since the flexible sheets 102, 120, and 302 are extremely thin relative to conventional PTC materials and devices, the flexible sheets 102, 120 may be implemented in applications that require small, slim, or low-profile form factors (e.g., wearable devices, cell phones, etc.) while still providing robust overcurrent/overtemperature protection.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

We claim:

1. A flexible sheet comprising a layer of positive temperature coefficient (PTC) material formed of a polymer resin, an anti-arcing material, and a conductive filler, the layer of PTC material having a thickness in a range of 10 μm to 100 μm, a plurality of perforations defining a plurality of openings in the layer of PTC material, wherein greater than 25% of the layer of PTC material is open space defined by the openings.

2. The flexible sheet of claim 1, wherein greater than 50% of the layer of PTC material is open space defined by the openings.

3. The flexible sheet of claim 2, wherein greater than 75% of the layer of PTC material is open space defined by the openings.

4. The flexible sheet of claim 1, wherein the thickness of the layer of PTC material is in a range of 15 μm to 25 μm.

5. A method for forming a flexible sheet of positive temperature coefficient (PTC) material, the method comprising:

preparing a PTC ink from a polymer resin, an anti-arcing material, a conductive filler, and a solvent;

applying the PTC ink to a substrate;

allowing the PTC ink to dry so that the solvent evaporates and leaves a solid layer of PTC material on the substrate; and perforating the solid layer of PTC material such that greater than 25% of the solid layer of PTC material is open space defined by the openings.

6. The method of claim 5, further comprising pulling a blade over the PTC ink to create a uniformly thick layer of the PTC ink on the substrate.

7. The method of claim 6, wherein the uniformly thick layer of the PTC ink has a thickness in a range of 10 μm to 100 μm.

8. The method of claim 7, wherein the thickness of the uniformly thick layer of the PTC ink is in a range of 15 μm to 25 μm.

9. The method of claim 5, further comprising adding at least one of an antioxidant and an adhesion promoter to the PTC ink.

10. The method of claim 5, wherein the polymer resin is formed of semi-crystalline polymers including at least one of polyvinylidene difluoride, polyethylene, ethylene tetrafluoroethylene, ethylene-vinyl acetate, and ethylene butyl acrylate.

11. The method of claim 5, wherein the conductive filler is formed of at least one of tungsten carbide, nickel, and titanium carbide.

12. An electronic device comprising:
a protected component; and
a flexible positive temperature coefficient (PTC) device including a flexible sheet of PTC material formed of a polymer resin, an anti-arcing material, and a conductive filler, the flexible sheet of PTC material coupled to an exterior surface of the protected component, the flexible PTC device electrically connected to the protected component and adapted to arrest or mitigate electrical current flowing through the protected component, a plurality of perforations defining a plurality of openings in the flexible sheet of PTC material, wherein greater than 25% of the flexible sheet of PTC material is open space defined by the openings.

13. The electronic device of claim 12, wherein the flexible sheet of PTC material has a thickness in a range of 10 μm to 100 μm.

14. The electronic device of claim 12, wherein the flexible sheet of PTC material covers greater than 25% of the exterior surface of the protected component.

15. The electronic device of claim 14, wherein the flexible sheet of PTC material covers greater than 50% of the exterior surface of the protected component.

16. The electronic device of claim 15, wherein the flexible sheet of PTC material covers greater than 75% of the exterior surface of the protected component.

17. The electronic device of claim 12, wherein the protected component comprises at least one battery, and wherein the flexible PTC device is connected electrically in series between the at least one battery and an electrical load.

* * * * *